(Model.)
A. M. GRANGER.
Apparatus for Extinguishing Fires.
No. 241,000. Patented May 3, 1881.
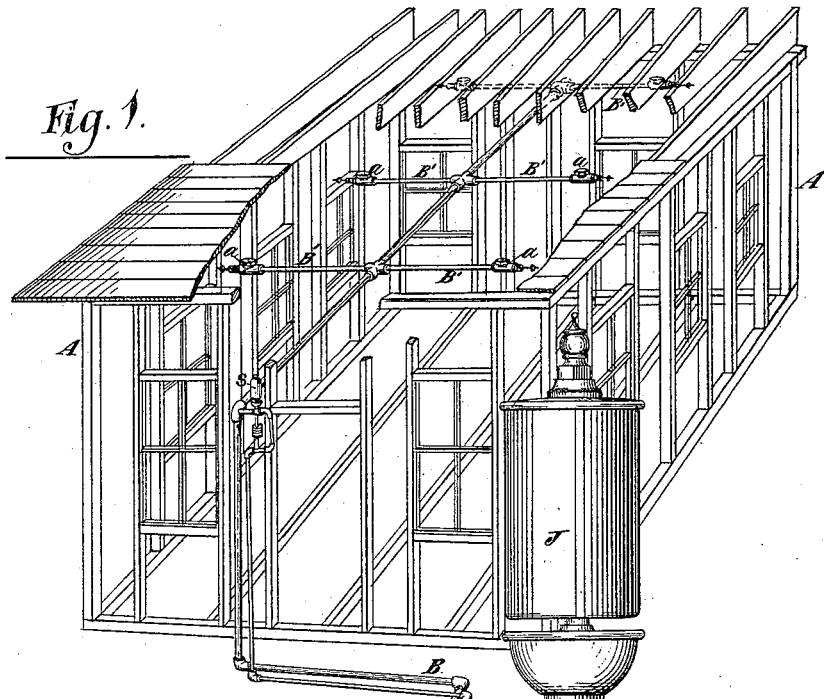
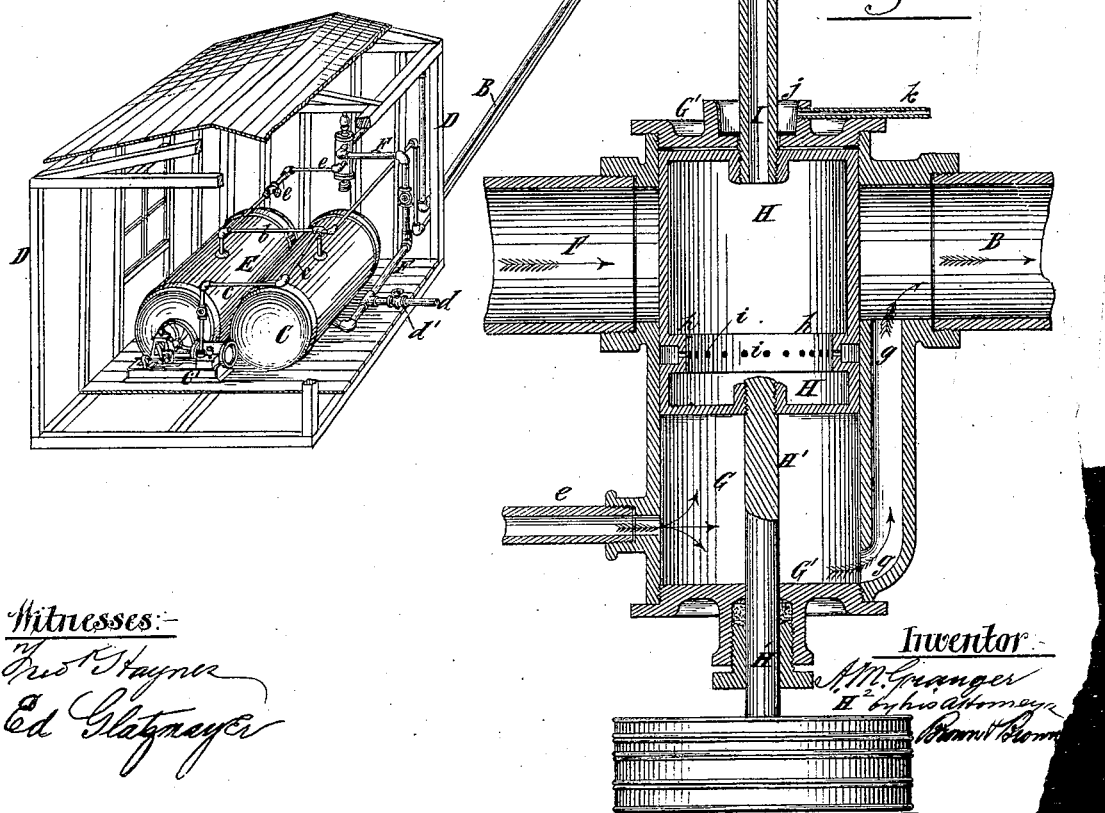

UNITED STATES PATENT OFFICE.

ALMON M. GRANGER, OF BOSTON, MASSACHUSETTS.

APPARATUS FOR EXTINGUISHING FIRES.

SPECIFICATION forming part of Letters Patent No. 241,000, dated May 3, 1881.

Application filed February 14, 1881. (Model.)

*To all whom it may concern:*

Be it known that I, ALMON M. GRANGER, of Boston, in the county of Suffolk and State of Massachusetts, have invented certain new and useful Improvements in Apparatus for Extinguishing Fires, of which the following is a specification.

My invention relates to fire-extinguishing apparatus in which are employed a system of water-distributing pipes extending throughout a building and kept closed by valves which are automatically released by the heat upon the breaking out of a fire in the building.

The object of my invention is to maintain in the distributing-pipes of the system a constant and uniform pressure of air or gas, whereby the water is kept out of said pipes while the apparatus is not in operation, and to utilize the sudden diminution of pressure in said pipes produced by one of the outlet-valves being opened by heat, for the purpose of instantly and automatically shutting off the supply of air or gas to the distributing-pipes and admitting water thereto, the water being forced into them either by the compressed air or gas, or by hydrant-pressure in localities having street-service.

The invention consists in a novel apparatus for extinguishing fires, in which is combined a system of distributing-pipes, a pipe for supplying water to said distributing-pipes under control of a valve, a motor with which said valve is connected, a tank for compressed air or gas communicating with said motor and through said motor with the said distributing-pipes, whereby a pressure is maintained in said motor and distributing-pipes sufficient to keep said valve closed and shut off the water from the distributing-pipes so long as the outlets of said pipes are closed, but as soon as a diminution of pressure takes place in the distributing-pipes the motor operates and opens the valve, to permit the passage of water to the distributing-pipes. The aforesaid motor and valve constitute the means whereby the air or gas is cut off from the distributing-pipes and water admitted to them whenever a decided diminution of pressure takes place in said pipes.

Whenever the apparatus is not in operation the air or gas tank is always in constant and uninterrupted communication with the distributing-pipes, and hence any slight leakage in the pipes or fittings is supplied by the tank and a uniform pressure kept up in the pipes, so that the water can never enter the distributing-pipes unless there is a sudden and great diminution of pressure therein, such as would be caused by one of the outlet-valves being opened or released by a fire.

The valve which I prefer to use is a piston-valve, and by admitting air-pressure to the cylinder below the valve the valve is kept closed and the passage of water from the supply-pipe to the distributing-pipes prevented. The water may be supplied by hydrant-pressure in localities which are supplied by water-works; but in other places I employ a water-tank which communicates with the compressed air or gas tank, and as soon as the valve is opened by the diminution of pressure in the distributing-pipes the water is expelled from its tank by the expansive force of the compressed air or gas acting upon it. I also combine with the piston-valve a whistle, which is operated by air or gas from the aforesaid tank when the valve is opened to give an alarm.

In the accompanying drawings, Figure 1 is a perspective view of an apparatus embodying my invention, and Fig. 2 represents a central vertical section through a valve and motor which I employ.

Similar letters of reference designate corresponding parts in both figures.

A represents the frame-work of a building which is to be protected from fire, and through which extends a system of distributing-pipes for water. This system is composed, in the present example of my invention, of a main pipe, B, and branch pipes B', extending therefrom, and provided at their ends or at other suitable points with closed valves *a*, which will be released by the heat of a fire within the building. Each valve may be kept closed by a piece of fusible metal or alloy, which may be applied to or combined with the valve in any well-known manner, and which, when melted by heat, will allow the valve to open by the pressure within the pipes. This system of distributing-pipes and automatic valves is not in itself new; but, commonly, the pipes are always full of water, and hence are very likely to freeze and render the whole system absolutely worthless at the time when wanted.

In my apparatus the water is always kept out of the distributing-pipes until the breaking out of a fire, and in the novel means whereby this is effected forms the subject-matter of my invention, and will now be described.

C designates a water-tank of large capacity— say, for example, one thousand gallons—which is arranged in any suitable locality near the building to be protected, as here shown in a separate building, D; and E designates a similar tank, which is to contain compressed air or gas. Any suitable means may be employed for maintaining a constant pressure of air or gas in the tank E, and the tanks C and E are connected by a pipe, $b$, through which the pressure of the air or gas is transmitted to the surface of the water in the tank C.

Air or gas may be supplied to the tank E through a supply-pipe, $c$, by a compressor, $c'$, or by other means, and water may be supplied to the tank C through a supply-pipe, $d$, by a pump or other means, (not here shown,) or from the street-main in places having water-works.

In the supply-pipe $d$ is arranged a check-valve, $d'$, which prevents any water delivered into the tank from being forced out the pipe $d$, instead of through the distributing-pipes. This valve is desirable, because where the supply of water is taken from the street-main the pressure in the main might be diminished by reason of the large consumption of water for extinguishing a fire or other purpose, so that when the pressure of air or gas is discharging water from the tank C it will be forced backward through the supply-pipe $d$ if the check-valve were not used.

From the water-tank C extends a pipe, F, and from the air or gas tank E extends a pipe, $e$, both of which communicate with the main pipe B of the distributing-system through a combined valve or motor, which I will now describe, and which is shown on a large scale in Fig. 2.

G designates a cylinder, closed by heads G' at each end, and having the pipe F from the water-tank C opening into it on one side and the main pipe B of the distributing system opening from it upon the opposite side; hence it will be readily seen that no water can reach the distributing system from the water-tank without passing through the cylinder G.

Within the cylinder G is fitted a long hollow piston-valve, H, from which extends downward a piston or valve rod or stem, H', which passes through a stuffing-box, $f$, in the lower head, G', and has applied to it, below the cylinder, a weight, $H^2$, composed of several sections, more or less of which may be used, as circumstances may require.

It is obvious that when the piston-valve H is held in its highest position, as shown in Fig. 2, it will shut off all communication between the water-supply pipe F from the tank C and the main pipe B of the distributing system, and will thus keep the system of pipes free of water.

The pipe $e$, leading from the air or gas tank E, and previously referred to, enters the cylinder G below the end of the piston-valve H when it is in the position represented, and it will be obvious that the air-pressure will exert an upward pressure upon the piston-valve to force it upward and hold it in its highest position. The weight $H^2$ should be adjusted so that it will not be sufficient to prevent the upward movement of the valve H by the air-pressure. It will thus be understood that not only does the piston H serve as a valve, but it also, in connection with the cylinder G, constitutes a motor. In lieu of this form of motor, however, a diaphragm motor might be employed and connected with a suitable valve, so that together they would perform the functions of the valve and motor here shown, and the motor used might be operated by a weight to open the valve, as here shown, or by a suitably-arranged spring or springs. The air or gas pipe $e$ is very small—say one-fourth inch in diameter—for a purpose hereinafter explained.

From the portion of the cylinder G below the piston-valve H extends a pipe or passage, $g$, which leads into the main pipe B of the distributing system, and hence it will be seen that when the water is shut off from the pipe B the said pipe is in free communication, through the cylinder G, with the air or gas tank E, and a pressure maintained in all the pipes of the distributing system equal to the pressure in the tank E.

As the air or gas tank, while the apparatus is not in operation, is in constant and uninterrupted communication with the distributing-pipes, a constant and uniform pressure is maintained in said pipes, even if there should be any slight leakages in them, as there will probably be; but whenever any one of the valves $a$ in the distributing system is automatically released by a fire it will be clearly seen that the pressure of air or gas in all the pipes of the distributing system will be at once greatly diminished, and as the air or gas cannot flow through the small pipe $e$ fast enough to maintain the necessary pressure in the cylinder G, the weight $H^2$ overcomes the air or gas pressure in the cylinder and draws the piston-valve H down, opening communication between the pipe F leading from the water-tank C and the main pipe B of the distributing system A. Free communication being opened between the tank C and the pipes of the distributing system, the pressure of air or gas which is communicated to the surface of the water in the tank C by the pipe $b$ forces the water out of the tank and through all the pipes and sprinklers of the distributing system which are open upon the fire, and continues so long as there is water in the tank. After the water is all expelled the air or gas which is now in the two tanks C and E will likewise flow through the pipes of the distributing system until the pressure is exhausted, and if carbonic-acid gas is used it will itself form a powerful agent to put out the fire.

The water is discharged only through the branch pipes of the system in which the valves are opened by the fire, and hence it will be seen that no water is wasted by being discharged into rooms of the building in which is no fire, but that the whole supply of water is delivered at the place where most needed.

When the piston-valve H is drawn down to the bottom of the cylinder by the weight $H^2$ an annular recess, $h$, in said valve comes opposite the pipe $e$, and air or gas passes from said pipe through perforations or openings $i$ in the bottom of said recess into the hollow piston-valve, and flows through a pipe, I, leading from the upper end of the piston-valve, and through a whistle, J, carried by said pipe, thus sounding an alarm to give notice of the fire. Any water which may leak through the upper head, $G'$, of the cylinder is retained by a well, $j$, and conducted off by a drip-pipe, $k$.

Where the supply of water is taken from the city water-works, in which a constant pressure is maintained, the pipe F may be a service-pipe leading from the water-main. In such case the compressed air or gas is only used for keeping the valve H closed, and not as a means of impelling the water.

In lieu of the arrangement here shown for making the change in the supply to the distributing-pipes from air or gas to water, any kind of a motor might be used for opening cocks or other forms of valves in connection with a distributing system and a supply-pipe; but in any case the distributing-pipes are in constant communication with the air or gas tank through the motor, and are always kept full of air or gas under pressure.

Although I have here shown separate tanks for water and for air or gas, it is obvious that a single tank might be used, the outlet-pipe F being carried from the bottom of the tank to the valve or valves, and the air or gas pipe $e$ being carried from the upper part of the tank to the motor.

If desirable, a cylinder and piston similar to the cylinder G and piston H might be connected with the distributing system of pipes for giving an alarm at any remote point upon the breaking out of a fire, as seen at $s$ in Fig. 1. In such case the pipe $e$, leading from the air or gas tank, and the pipe or passage $g$, leading from the distributing-pipes, would be employed; but the pipes F and B would not be needed, and the piston H would not serve as a valve.

The great advantage of my invention is that I provide for maintaining a constant and uniform pressure in the distributing-pipes, even if there should be some slight leakage, and hence the water cannot get into the pipes and be liable to freeze. The air-tank is constantly in communication with the pipes until a sudden diminution of pressure occurs, and the air-supply is then instantly and automatically changed for a water-supply.

What I claim as my invention, and desire to secure by Letters Patent, is—

1. In a fire-extinguishing apparatus, the combination of a system of distributing-pipes and a water-supply therefor, a compressed air or gas tank which is in constant and uninterrupted communication with said distributing-pipes when the apparatus is not in operation, and serves to maintain a uniform pressure therein, and means which, upon a sudden diminution of pressure in said distributing-pipes, will act to automatically shut off the passage of air or gas to said distributing-pipes and admit water thereto, substantially as specified.

2. In a fire-extinguishing apparatus, the combination of a system of distributing-pipes and a water-supply pipe therefor, a compressed air or gas tank which is in constant and uninterrupted communication with said distributing-pipes when the apparatus is not in operation, and a valve and motor which is acted upon by the compressed air or gas to close the water-supply pipe, but which upon a diminution of pressure in said distributing-pipes will operate to shut off the supply of air or gas from said distributing-pipes and admit water thereto, substantially as specified.

3. The combination of a cylinder, a supply-pipe, and a pipe leading to a system of distributing-pipes communicating with said cylinder upon opposite sides, a piston-valve adapted to be moved in said cylinder to cut off communication between the supply and distributing pipes, a tank for supplying compressed air or gas to said cylinder to act upon the piston and close the fluid-supply pipe, and a pipe or passage for conducting air or gas from said cylinder to said distributing-pipes, substantially as and for the purpose specified.

4. The combination of two communicating water and air or gas tanks, C and E, the cylinder G, with supply-pipe F and discharge-pipe B, the piston-valve H, the pipe $e$, for conducting air or gas to the said cylinder, and the passage $g$, substantially as specified.

5. The combination, with a system of pipes extending through a building and provided with outlet-valves which are held closed by fusible metal, of a tank for supplying compressed air or gas to said pipes, for maintaining a constant and uniform pressure therein, a whistle or audible alarm connected with said tank, and a valve adapted to be opened automatically upon a diminution of pressure in said pipes, to permit the passage of air or gas from said tank to operate said whistle or alarm, substantially as specified.

6. The combination of the cylinder G, the hollow piston-valve H, having an annular recess, $h$, in which are perforations $i$, and carrying a whistle, J, the pipes F B, for the supply and discharge of water, the air or gas supply pipe *e*, and the pipe or passage *g*, substantially as specified.

7. The combination of the cylinder G, the hollow piston H, having an annular recess, *h*, in which are perforations *i*, the pipe I, extending from said piston, the whistle J, the air or gas supply pipe *e*, and the pipe B and passage *g* communicating therewith, substantially as specified.

ALMON M. GRANGER.

Witnesses:
FREDK. T. HAYNES,
A. C. WEBB.